United States Patent
Hanabusa

(10) Patent No.: US 10,541,559 B2
(45) Date of Patent: Jan. 21, 2020

(54) WIRELESS POWER TRANSMITTING DEVICE AND WIRELESS POWER TRANSMISSION SYSTEM USING THE SAME

(71) Applicant: TDK CORPORATION, Tokyo (JP)

(72) Inventor: Kazuyoshi Hanabusa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 132 days.

(21) Appl. No.: 15/933,884

(22) Filed: Mar. 23, 2018

(65) Prior Publication Data

US 2018/0287396 A1    Oct. 4, 2018

(30) Foreign Application Priority Data

Mar. 30, 2017 (JP) ................. 2017-067885

(51) Int. Cl.
| | |
|---|---|
| *H02J 50/10* | (2016.01) |
| *H02J 5/00* | (2016.01) |
| *H02J 50/80* | (2016.01) |
| *H02J 50/12* | (2016.01) |
| *H02J 50/70* | (2016.01) |
| *H02J 50/90* | (2016.01) |
| *H02J 7/02* | (2016.01) |
| *H02J 7/00* | (2006.01) |
| *H02M 7/537* | (2006.01) |

(52) U.S. Cl.
CPC ............. *H02J 50/10* (2016.02); *H02J 5/005* (2013.01); *H02J 7/025* (2013.01); *H02J 50/12* (2016.02); *H02J 50/70* (2016.02); *H02J 50/80* (2016.02); *H02J 50/90* (2016.02); *H02J 2007/0059* (2013.01); *H02M 7/537* (2013.01)

(58) Field of Classification Search
None
See application file for complete search history.

(56) References Cited

U.S. PATENT DOCUMENTS

| | | | |
|---|---|---|---|
| 2016/0141919 A1* | 5/2016 | Ohashi | B60L 53/60 320/108 |
| 2017/0098963 A1* | 4/2017 | Takahashi | B60L 53/12 |
| 2018/0006581 A1* | 1/2018 | Ishihara | H02M 7/48 |

FOREIGN PATENT DOCUMENTS

JP    2016-167972 A    9/2016

* cited by examiner

*Primary Examiner* — Jared Fureman
*Assistant Examiner* — Joel Barnett
(74) *Attorney, Agent, or Firm* — Young Law Firm, P.C.

(57) ABSTRACT

Disclosed herein is a wireless power transmitting device that includes: a boost converter boosting an input DC voltage; an inverter converting an output voltage of the boost converter into an AC voltage; a power transmitting coil supplied with the AC voltage to generate an AC magnetic field; a receiving circuit receiving a power transmission command signal; a boost control circuit controlling a boost level of the boost converter according to the power transmission command signal; an operation detection circuit detecting whether or not the boost converter is operated; and an inverter control circuit controlling the inverter. The operation detection circuit activates a stop signal when detecting that the boost converter does not perform operation after an elapse of a predetermined time period from a start of power transmission. The inverter control circuit stops an operation of the inverter in response to the stop signal.

6 Claims, 7 Drawing Sheets

WIRELESS POWER TRANSMITTING DEVICE AND WIRELESS POWER TRANSMISSION SYSTEM USING THE SAME

BACKGROUND OF THE INVENTION

Field of the Invention

The present invention relates to a wireless power transmitting device that transmits power and signals by wireless and a wireless power transmission system using the wireless power transmitting device.

Description of Related Art

A wireless power transmission technology of transmitting power without the use of a power cable or a power cord is now attracting attention. The wireless power transmission technology enables power to be supplied from a power transmission side to a power receiving side by wireless, and is thus expected to be applied to various products such as transport equipment (electric trains, electric cars), home electric appliances, electronic devices, wireless communication devices, toys, and industrial equipment.

When such wireless power transmission technology is applied to power supply to a mobile body, it is necessary to start power transmission after confirming that a power receiving coil on the power reception side mounted on the mobile body exists within a predetermined area (power receiving area) capable of receiving power.

To respond to such a requirement, JP 2016-167972A proposes a system including a power transmission side device having: a power transmitting unit and a communicating means; and a power reception side device having a power receiving unit and a communication means. In this system, minute power is transmitted to the power receiving unit before the charging of a battery connected to the power reception side device is started, and a state related to the battery is switched from a first state incapable of performing charging to a second state capable of performing charging on the condition that the power receiving unit has received the minute power. When information indicating that the battery is in the second state has been received, the power transmitting unit transmits power greater than the minute power to the power receiving unit, instead of the minute power.

However, in the technology disclosed in JP 2016-167972A, complicated control is required for the transmission of the minute power, and it is difficult to ensure position detection accuracy. Further, an expensive semiconductor circuit is required to realize complicated control. Further, in the above system, the communication means establishes bidirectional wireless communication, so that an expensive communication configuration needs to be implemented.

SUMMARY

The present invention has been made in view of the above problems, and the object thereof is to provide a wireless power transmitting device having an inexpensive and high-quality position detection function and a wireless power transmission system using the wireless power transmitting device.

To solve the above problems, a wireless power transmitting device according to the present invention is a device that transmits power to a wireless power receiving device by wireless, the wireless power transmitting device includes: a boost converter that boosts an input DC voltage; an inverter that converts an output voltage of the boost converter into an AC voltage; a power transmitting coil that is supplied with the AC voltage to generate an AC magnetic field; a receiving circuit that receives a power transmission command signal from the wireless power receiving device; a boost control circuit that controls a boost level of the boost converter according to the power transmission command signal; an operation detection circuit that detects whether or not the boost converter is operated; and an inverter control circuit that controls the inverter, wherein the operation detection circuit activates a stop signal when detecting that the boost converter does not perform operation after an elapse of a predetermined time period from a start of power transmission, and wherein the inverter control circuit stops an operation of the inverter in response to the stop signal.

A wireless power transmission system according to the present invention includes the wireless power transmitting device of the present embodiments having the above features and a wireless power receiving device that receives power from the wireless power transmitting device by wireless. The wireless power receiving device includes: a power receiving coil that takes in AC power through the AC magnetic field; a rectifying circuit that converts the AC power received by the power receiving coil into DC power; an output detection circuit that generates the power transmission command signal based on a comparison result between an output characteristic value of the rectifying circuit and a target value; a transmitting circuit that transmits the power transmission command signal; and a start-up circuit that permits transmission of the power transmission command signal to the receiving circuit when the output characteristic value of the rectifying circuit is equal to or larger than a threshold value.

BRIEF DESCRIPTION OF THE DRAWINGS

The above and other objects, features and advantages of this invention will become more apparent by reference to the following detailed description of the invention taken in conjunction with the accompanying drawings, wherein.

DETAILED DESCRIPTION OF THE EMBODIMENTS

Preferred embodiments of the present invention will now be explained in detail with reference to the drawings.

Figure 1:
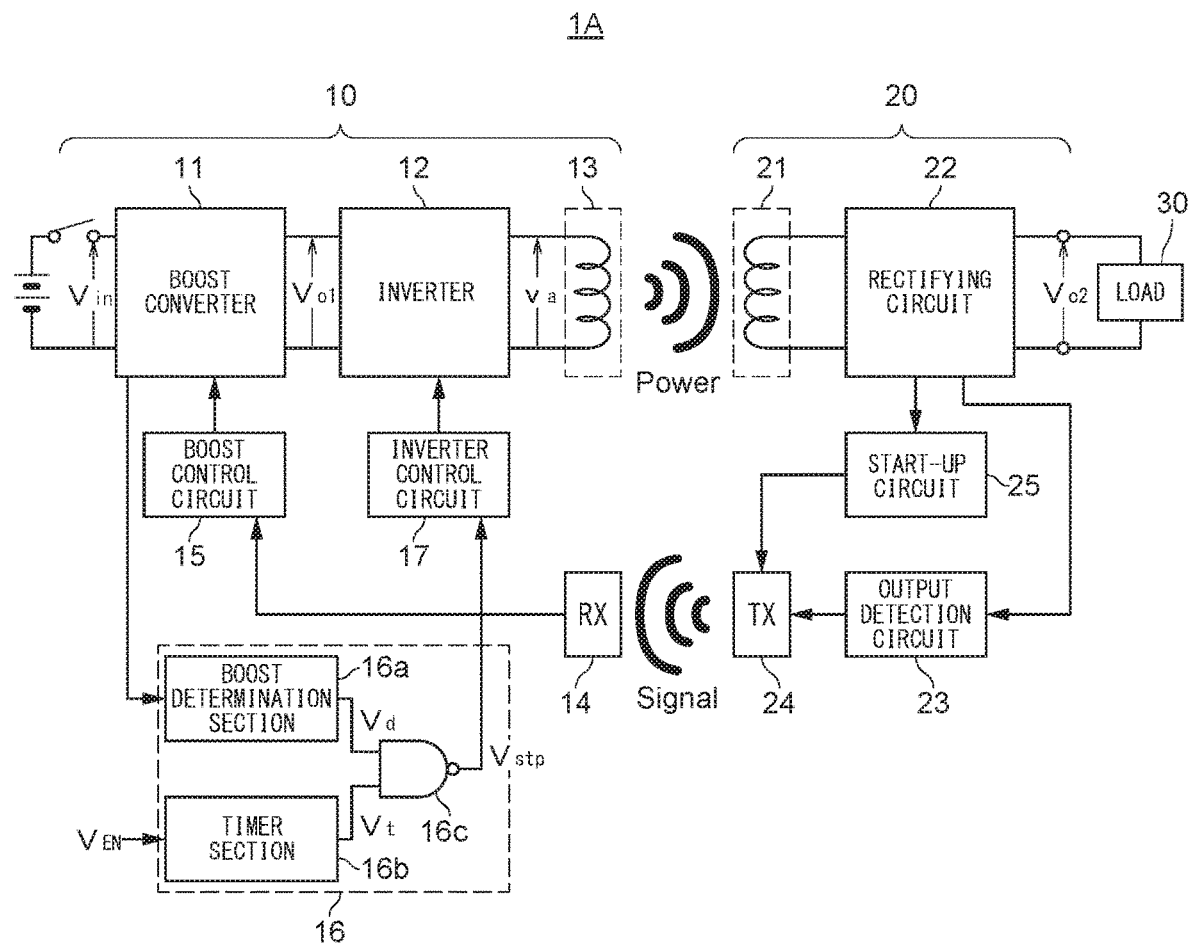
FIG. 1 is a block diagram illustrating the configuration of a wireless power transmission system according to a first embodiment of the present invention.

FIG. 1 is a block diagram illustrating the configuration of a wireless power transmission system according to the first embodiment of the present invention.

As illustrated in FIG. 1, a wireless power transmission system 1A of the present embodiment includes a combination of a wireless power transmitting device 10 and a wireless power receiving device 20 and transmits power by wireless from the wireless power transmitting device 10 to the wireless power receiving device 20.

The wireless power transmitting device 10 includes a boost converter 11 that boosts an input DC voltage $V_{in}$, an inverter 12 that converts an output voltage $V_{o1}$ of the boost converter 11 into an AC voltage $v_a$, a power transmitting coil 13 that is supplied with the AC voltage $v_a$ to generate an AC magnetic field, a receiving circuit 14 that receives a power transmission command signal transmitted from the wireless power receiving device 20, a boost control circuit 15 that controls the boost level of the boost converter 11 according to the power transmission command signal, an operation detection circuit 16 that detects whether or not the boost converter 11 is operated, and an inverter control circuit 17 that controls the operation of the inverter 12.

The wireless power receiving device 20 includes a power receiving coil 21 that takes in AC power through the AC magnetic field, a rectifying circuit 22 that converts the AC power received by the power receiving coil 21 into DC power, an output detection circuit 23 that generates the power transmission command signal based on a comparison result between an output voltage (output characteristic value) of the rectifying circuit 22 and a target voltage (target value), a transmitting circuit 24 that transmits the power transmission command signal, and a start-up circuit 25 that permits the transmission of the power transmission command signal to the receiving circuit 14 when the output voltage (output characteristic value) of the rectifying circuit 22 is equal to or larger than a threshold value.

The input DC voltage $V_{in}$ of the wireless power transmitting device 10 is boosted by the boost converter 11, converted into an AC voltage by the inverter 12, and supplied to the power transmitting coil 13. When the power receiving coil 21 of the wireless power receiving device 20 exists within a power receiving area, the AC magnetic field generated from the power transmitting coil 13 interlinks the power receiving coil 21 to induce an AC voltage in the power receiving coil 21. The AC voltage is converted into a DC voltage by the rectifying circuit 22 and is supplied to a load 30.

The level of the DC voltage to be supplied from the rectifying circuit 22 to the load 30 is preferably constant (e.g., 24 V). However, the actual output voltage of the rectifying circuit 22 is fluctuated depending on a magnetic coupling state between the power transmitting coil 13 and the power receiving coil 21. In particular, the actual output voltage of the rectifying circuit 22 is significantly influenced by the position of the power receiving coil 21 with respect to the power transmitting coil 13. Thus, in the present embodiment, the output detection circuit 23 generates the power transmission command signal based on the output level of the rectifying circuit 22. The generated power transmission command signal is transmitted from the transmitting circuit 24 of the wireless power receiving device 20 to the wireless power transmitting device 10, whereby the output level of the rectifying circuit 22 is notified to the wireless power transmitting device 10.

When outputting the power transmission command signal, the transmitting circuit 24 converts the power transmission command signal into an optical signal. The receiving circuit 14 receives the optical signal and converts it into an electrical signal. To this end, the transmitting circuit 24 includes a light-emitting element such as a photodiode, and the receiving circuit 14 includes a light-receiving element such as a phototransistor. The power transmission command signal is an analog signal, and the magnitude thereof is varied in accordance with the magnitude relationship between the output level of the rectifying circuit 22 and a target level. The boost level of the boost converter 11 is controlled by the boost control circuit 15. The boost control circuit 15 adjusts the boost level based on the power transmission command signal such that the boost level is increased as the level of the power transmission command signal becomes larger, whereby the output voltage level of the rectifying circuit 22 can be kept constant.

Figure 2:
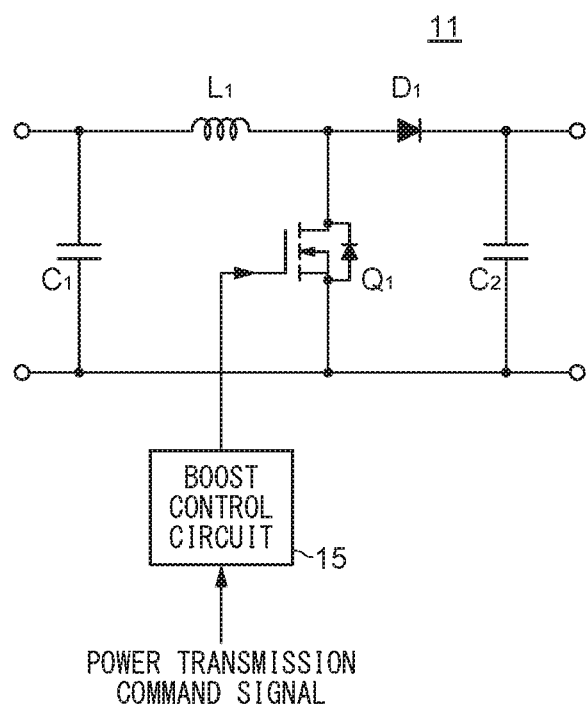
FIG. 2 is a circuit diagram illustrating an example of the configuration of a boost converter.

FIG. 2 is a circuit diagram illustrating an example of the configuration of the boost converter 11.

As illustrated in FIG. 2, the boost converter 11 includes a switching element $Q_1$ inserted in parallel to a pair of balanced lines, a choke coil $L_1$ inserted in series to the former stage of the switching element $Q_1$, a diode $D_1$ inserted in series into the latter stage of the switching element $Q_1$, an input capacitor $C_1$ provided between input terminals of the balanced lines, and an output capacitor $C_2$ between output terminals of the balanced lines. The ON/OFF operation of the switching element $Q_1$ is controlled by the boost control circuit 15. The boost control circuit 15 controls the ON/OFF period of the switching element $Q_1$ based on the power transmission command signal to thereby control the level of a DC voltage to be supplied to the latter stage inverter 12. When ON time in the switching period of the switching element $Q_1$ is long, the boost level is increased, while when ON time in the switching period is short, the boost level is reduced. When the power transmission command signal is not supplied to the boost control circuit 15, switching control of the switching element $Q_1$ is not performed. That is, the switching element $Q_1$ is kept in an OFF state, so that the output voltage of the boost converter 11 becomes substantially the same level as that of an input voltage.

Figure 3B:
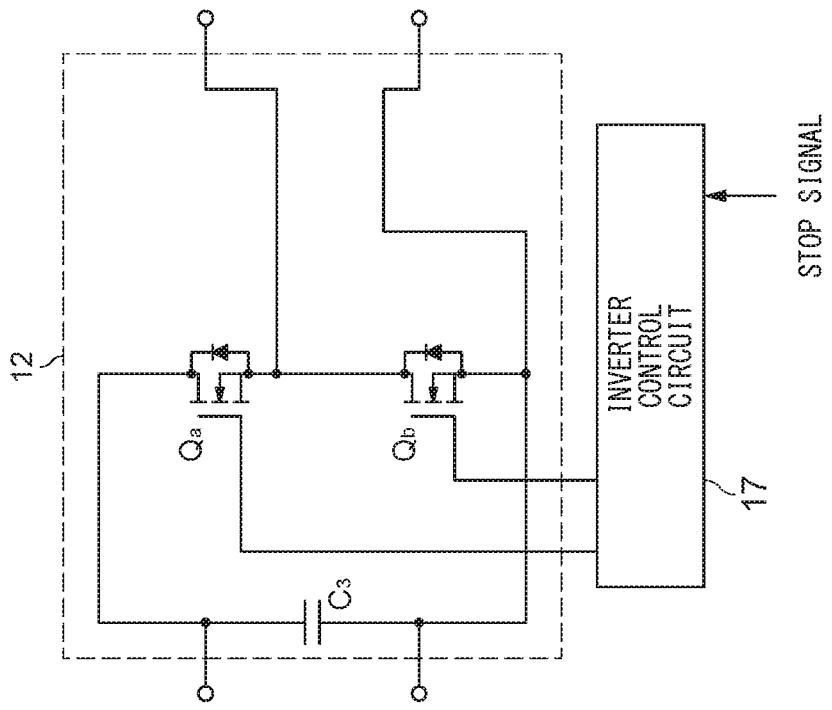
FIGS. 3A and 3B are circuit diagrams each illustrating an example of the configuration of an inverter.
Figure 3A:
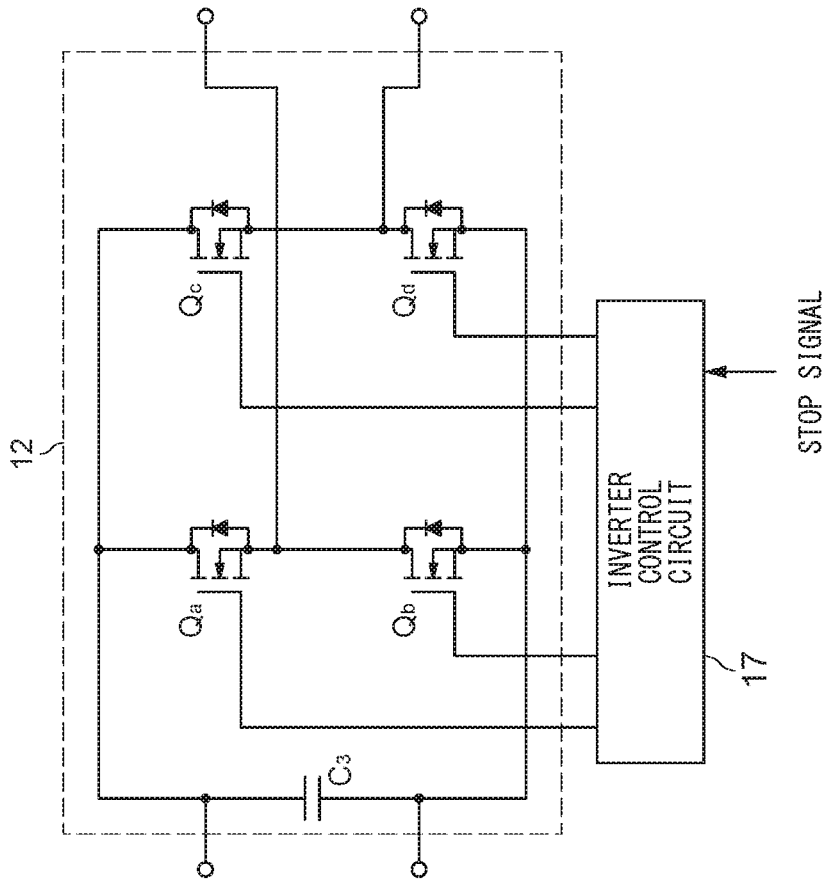

FIGS. 3A and 3B are circuit diagrams each illustrating an example of the configuration of the inverter 12.

As illustrated in FIG. 3A, the inverter 12 may be a full-bridge type inverter using four switching elements $Q_a$, $Q_b$, $Q_c$, and $Q_d$. Alternatively, as illustrated in FIG. 3B, the inverter 12 may be a half-bridge type inverter using two switching elements $Q_a$ and $Q_b$. In both the above configurations, the switching elements are controlled by the inverter control circuit 17. Further, when being inputted with, e.g., a low active stop signal from the operation detection circuit 16, the inverter control circuit 17 turns off all the switches to thereby stop the operation of the inverter 12.

Figure 4:
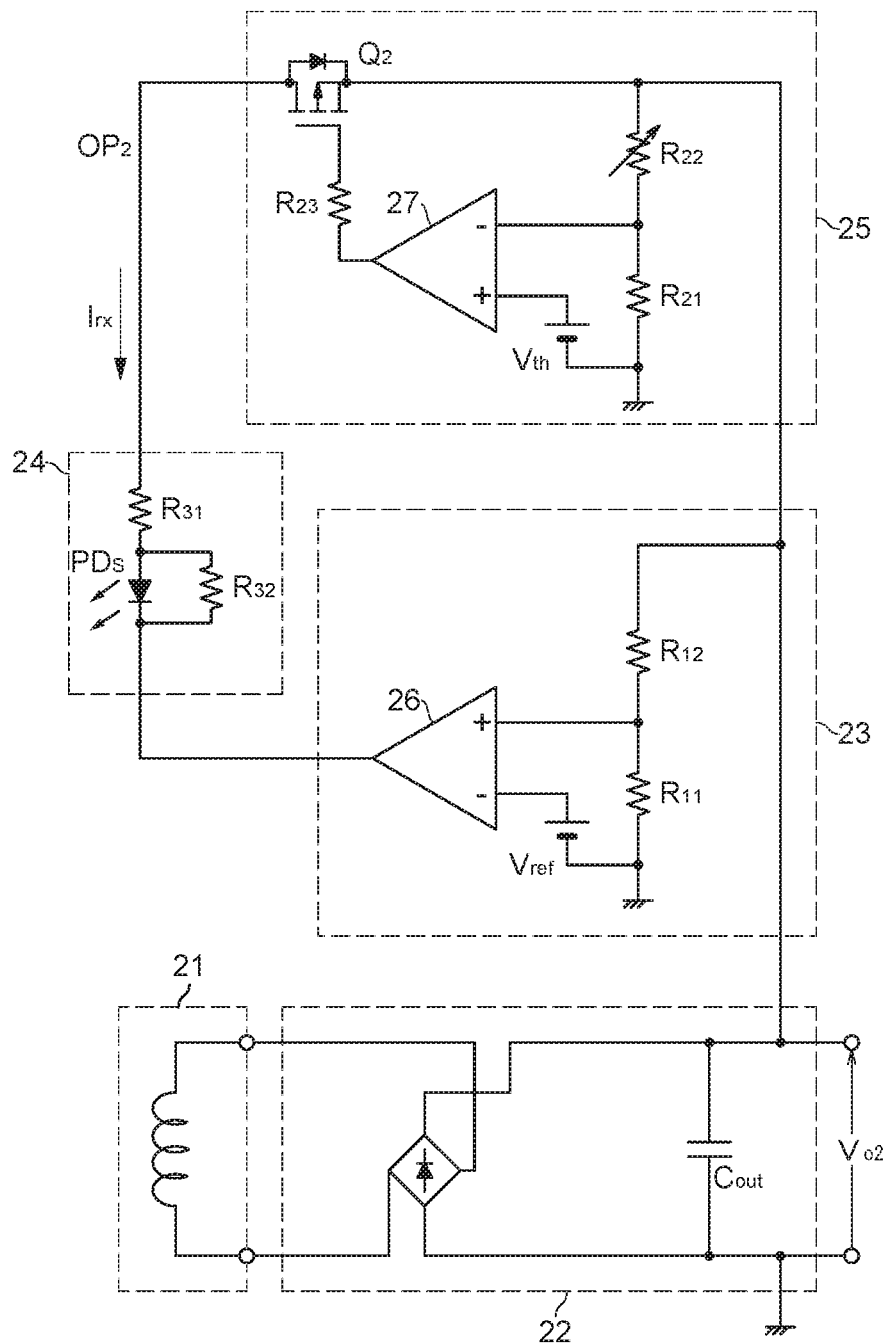
FIG. 4 is a circuit diagram illustrating an example of the configuration of a wireless power receiving device.

FIG. 4 is a circuit diagram illustrating an example of the configuration of the wireless power receiving device 20.

As illustrated in FIG. 4, the wireless power receiving device 20 includes the power receiving coil 21, the rectifying circuit 22, the output detection circuit 23, the transmitting circuit 24, and the start-up circuit 25. Input terminals of the output detection circuit 23 and start-up circuit 25 are both connected to an output terminal of the rectifying circuit 22, and thus an output voltage $V_{o2}$ of the rectifying circuit 22 is input to the output detection circuit 23 and the start-up circuit 25.

The output detection circuit 23 includes a voltage dividing circuit composed of voltage dividing resistances $R_{11}$ and $R_{12}$ and an operation amplifier 26 that amplifies a potential difference between the output voltage $V_{o2}$ of the rectifying circuit 22 divided by the voltage dividing circuit and a reference voltage $V_{ref}$. An output terminal of the operation amplifier 26 is connected to the transmitting circuit 24. The output voltage $V_{o2}$ of the rectifying circuit 22 is divided by the voltage dividing resistances $R_{11}$ and $R_{12}$ and is then input to a non-inversion input terminal of the operation amplifier 26 of the output detection circuit 23. An inversion input terminal of the operation amplifier 26 is supplied with the reference voltage $V_{ref}$.

The start-up circuit 25 includes a voltage dividing circuit composed of voltage dividing resistances $R_{21}$ and $R_{22}$, a comparator 27 (comparing circuit) that compares the output voltage $V_{o2}$ of the rectifying circuit 22 divided by the voltage dividing circuit and a threshold voltage $V_{th}$, and a switching element $Q_2$. The switching element $Q_2$ is a PMOS transistor whose source is connected to the output terminal of the rectifying circuit 22 and whose drain is connected to the transmitting circuit 24. The gate electrode (control electrode) of the switching element $Q_2$ is connected to an output terminal of the comparator 27 through a resistance $R_{23}$. The output voltage $V_{o2}$ of the rectifying circuit 22 is divided by the voltage dividing resistances $R_{21}$ and $R_{22}$ and is then input to an inversion input terminal of the comparator 27 of the start-up circuit 25. A non-inversion input terminal of the comparator 27 is supplied with the threshold voltage $V_{th}$.

The transmitting circuit 24 has a signal output diode $PD_s$(photodiode), a series resistance $R_{31}$, and a parallel resistance $R_{32}$. The power transmission command signal is output from the signal output diode $PD_s$ as an optical signal. The cathode side of the signal output diode $PD_s$ is connected to an output terminal of the output detection circuit 23 and the anode side thereof to an output terminal of a start-up circuit 25.

When the output voltage $V_{o2}$ of the rectifying circuit 22 is low, the output voltage of the operation amplifier 26 is low, so that a potential difference between both ends of the signal output diode $PD_s$ becomes large, causing a large current to flow in the signal output diode $PD_s$, with the result that the level of the power transmission command signal becomes large. On the other hand, when the output voltage $V_{o2}$ of the rectifying circuit 22 is large, the output voltage of the operation amplifier 26 is large, so that a potential difference between the both ends of the signal output diode $PD_s$ becomes small, causing a small current to flow in the signal output diode $PD_s$, with the result that the level of the power transmission command signal becomes small. In this manner, the output detection circuit 23 controls the level of the power transmission command signal.

When a divided voltage value ($=V_{o2} \cdot R_{21}/(R_{21}+R_{22})$) of the output voltage $V_{o2}$ of the rectifying circuit 22 to be input to the start-up circuit 25 is larger than a predetermined threshold voltage $V_{th}$, the output voltage of the comparator 27 is changed from H level to L level to turn on the switching element $Q_2$, with the result that a difference between the output voltage $V_{o2}$ of the rectifying circuit 22 and the output voltage of the operation amplifier 26 is applied to the signal output diode $PD_s$ as a forward bias voltage. Thus, a current inversely proportional to the output voltage $V_{o2}$ of the rectifying circuit 22 flows in the signal output diode $PD_s$ and the power transmission command signal (optical signal) is output from the signal output diode $PD_s$.

However, when a divided voltage value of the output voltage $V_{o2}$ of the rectifying circuit 22 to be input to the start-up circuit 25 is smaller than the predetermined threshold voltage $V_{th}$, the output voltage of the comparator 27 is kept at H level, so that the switching element $Q_2$ remains off. It follows that a current does not flow in the signal output diode $PD_s$, and the power transmission command signal is not output. In this manner, the start-up circuit 25 controls whether or not to output the power transmission command signal.

In the present embodiment, the voltage dividing resistance $R_{22}$ is a variable resistance and capable of adjusting the input voltage level of the inversion input terminal of the comparator 27.

For example, when the voltage dividing resistance $R_{22}$ is set to a comparatively small value, a comparatively large input voltage close to the output voltage level of the rectifying circuit 22 is applied to the inversion input terminal of the comparator 27. Thus, even when the output voltage $V_{o2}$ of the rectifying circuit 22 is small, the output voltage of the comparator 27 is easily changed to L level, allowing the power transmission command signal to be output. That is, even when the output voltage $V_{o2}$ of the rectifying circuit 22 is small because of the existence of the power receiving coil 21 at a position where it has poor magnetic coupling to the power transmitting coil 13, the starting of power transmission is permitted. This means that the power transmission starting condition is relaxed to widen a power receiving area.

On the other hand, when the voltage dividing resistance $R_{22}$ is set to a comparatively large value, a sufficiently smaller input voltage than the output voltage level of the rectifying circuit 22 is applied to the inversion input terminal of the comparator 27. Thus, unless the output voltage $V_{o2}$ of the rectifying circuit 22 is large, the output voltage of the comparator 27 cannot be changed to L level, so that the power transmission command signal cannot be output. That is, when the output voltage $V_{o2}$ of the rectifying circuit 22 is small because of the existence of the power receiving coil 21 at a position slightly apart from the power transmitting coil 13 where the power receiving coil 21 has poor magnetic coupling to the power transmitting coil 13, the starting of power transmission is not permitted. This means that the power transmission starting condition is made severe to narrow a power receiving area.

As described above, in the present embodiment, the voltage dividing resistance $R_{22}$ is configured as a variable resistance, and the variable resistance as an input setting section is adjusted, whereby a power receiving area for which power transmission can be started can be widened or narrowed. The voltage dividing resistance $R_{22}$ need not necessarily be configured as a variable resistance, but a threshold voltage (non-inversion input level) may be configured so as to be changeable. That is, it is only necessary for the input setting section to be able to change at least one of a threshold value level (non-inversion input level) to be input to the non-inversion input terminal of the comparator 27 and an output level (inversion input level) from the rectifying circuit 22 to be input to the inversion input terminal.

As illustrated in FIG. 1, the operation detection circuit 16 includes a boost determination section 16a, a timer section 16b that counts a certain time period (e.g., several seconds), and an NAND gate 16c and is configured to detect whether or not the boost converter 11 is operated after the elapse of a certain time period from the start of power transmission. The boost determination section 16a outputs an L-level voltage when the boost converter 11 is performing boost operation, while it outputs an H-level voltage when the boost converter 11 is not performing boost operation. As a method of detecting the boost operation of the boost converter 11, a method of comparing the input and output voltages of the boost converter 11 can be taken up as an example; however, the boost operation detecting method is not limited to this, and various method can be adopted. Alternatively, a plurality of methods may be combined.

The timer section 16b is a one-shot timer, and the output voltage (timer voltage) thereof is changed, e.g., from H level to L level with the input of an enable signal $V_{EN}$ as a trigger and is returned to H level after the elapse of a certain time period.

The NAND gate 16c outputs an L-level voltage when both the output voltage of the boost determination section 16a and the output voltage of the timer section 16b are at H level and, otherwise, outputs an H-level voltage. Thus, the output voltage of the operation detection circuit 16 becomes H level immediately after the start of power transmission. When the boost converter 11 is performing boost operation after the elapse of a certain time period from the start of power transmission, the output voltage of the operation detection circuit 16 is kept at H level, while when the boost converter 11 is not performing boost operation after the elapse of a certain time period from the start of power transmission, the output voltage of the operation detection circuit 16 is changed to L level.

The enable signal $V_{EN}$ is a signal different from the power transmission command signal and a signal instructing the start of power transmission after making the entire wireless power transmitting device 10 active. The output method for such an enable signal $V_{EN}$ is not particularly limited. For example, the enable signal $V_{EN}$ may be output at a timing when the wireless power transmitting device 10 is activated with power-on, etc., may be output at a timing when the existence of a mobile body mounting the wireless power receiving device 20 is detected by a monitoring camera, or may be output according to an instruction from the wireless power receiving device 20.

Figure 5:
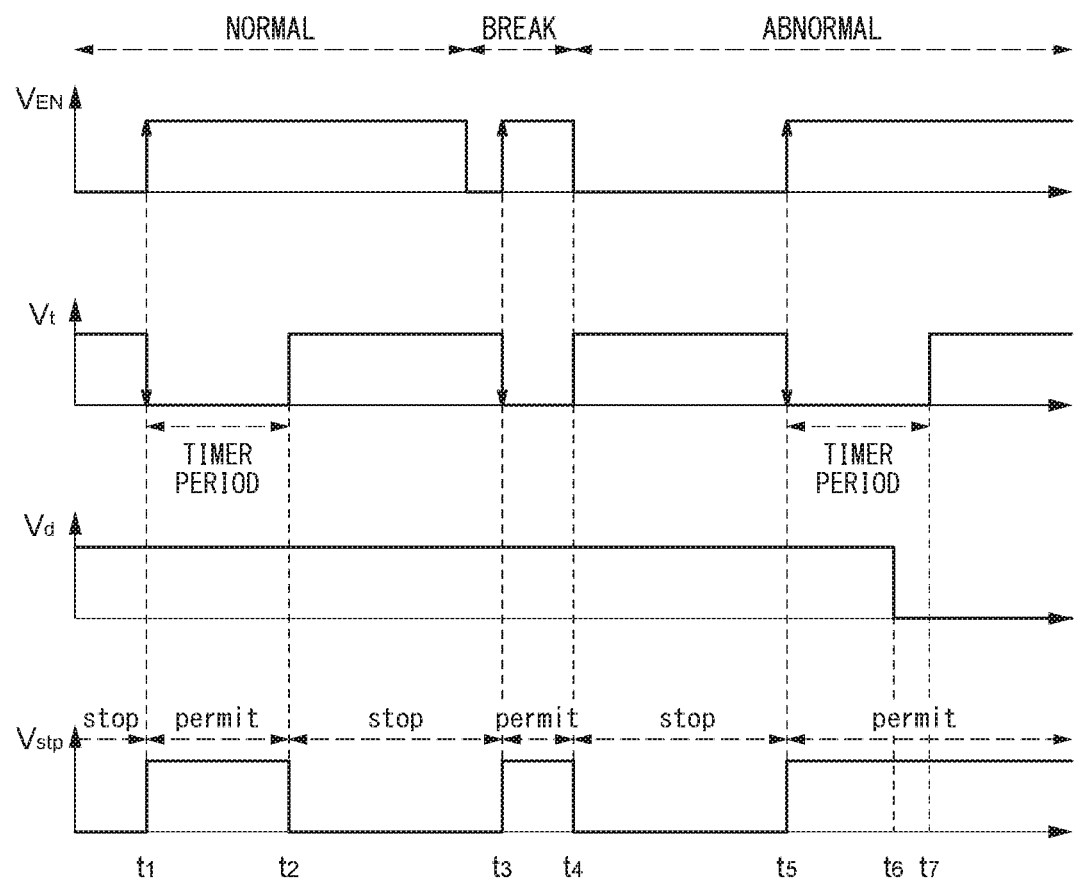
FIG. 5 is a voltage waveform diagram for explaining the operation of an operation detection circuit.

FIG. 5 is a voltage waveform diagram for explaining the operation of the operation detection circuit 16.

As illustrated in FIG. 5, when the enable signal $V_{EN}$ is changed from L level to H level at a timing $t_1$, a timer voltage $V_t$ (timer signal) is changed from H level to L level and then returned to H level after the elapse of a certain time period (timer time). During a time period from the timing $t_1$ and timing $t_2$ during which the timer voltage $V_t$ is kept at L level, an output voltage $V_{stp}$ of the NAND gate 16c assumes H level, and the inverter control circuit 17 permits the operation of the inverter 12.

When the boost determination section 16a does not detect the operation of the boost converter 11 at the timing $t_2$ when the timer voltage $V_t$ is returned to H level, an output voltage $V_d$ of the boost determination section 16a remains H level, so that the output voltage $V_{stp}$ of the NAND gate 16c is changed from H level to L level, and the inverter control circuit 17 stops the operation of the inverter 12. That is, the operation detection circuit 16 outputs a stop signal (L level) to the inverter control circuit 17.

Then, when, after the enable signal $V_{EN}$ becomes an H-level signal at a timing $t_3$, the enable signal $V_{EN}$ becomes an L-level signal at a timing $t_4$ before the elapse of a certain time period (timer time) counted by the timer section 16b, the timer operation of the timer section 16b is reset, and the timer voltage $V_t$ is forcibly returned to H level. As a result, both the timer voltage $V_t$ and the output voltage $V_d$ of the boost determination section 16a become H-level voltages, so that the inverter control circuit 17 stops the operation of the inverter 12 within a short time after the start of power transmission.

Then, when, after the enable signal $V_{EN}$ becomes an H-level signal at a timing $t_5$, the boost determination section 16a detects the operation of the boost converter 11 at a timing $t_6$ before the elapse of a certain time period counted by the timer section 16b, the output voltage $V_d$ of the boost determination section 16a is changed from H level to L level. Thereafter, the output voltage $V_d$ of the boost determination section 16a assumes L level at a timing $t_7$ when the timer voltage $V_t$ is returned to H level, so that the output voltage $V_{stp}$ of the NAND gate 16c is kept at H level, and the inverter control circuit 17 maintains the operation of the inverter 12. That is, the operation detection circuit 16 does not output a stop signal (L level) to the inverter control circuit 17.

As described above, the operation detection circuit 16 outputs the stop signal for stopping the operation of the inverter control circuit 17 when it cannot detect the operation of the boost converter 11 after the elapse of a certain time period from the start of power transmission. Thus, it is possible to promptly stop continuous supply of unnecessary power from the power transmission side to power reception side and thereby to enhance safety.

The overall operation of the wireless power transmission system 1A will be described.

Figure 6A:
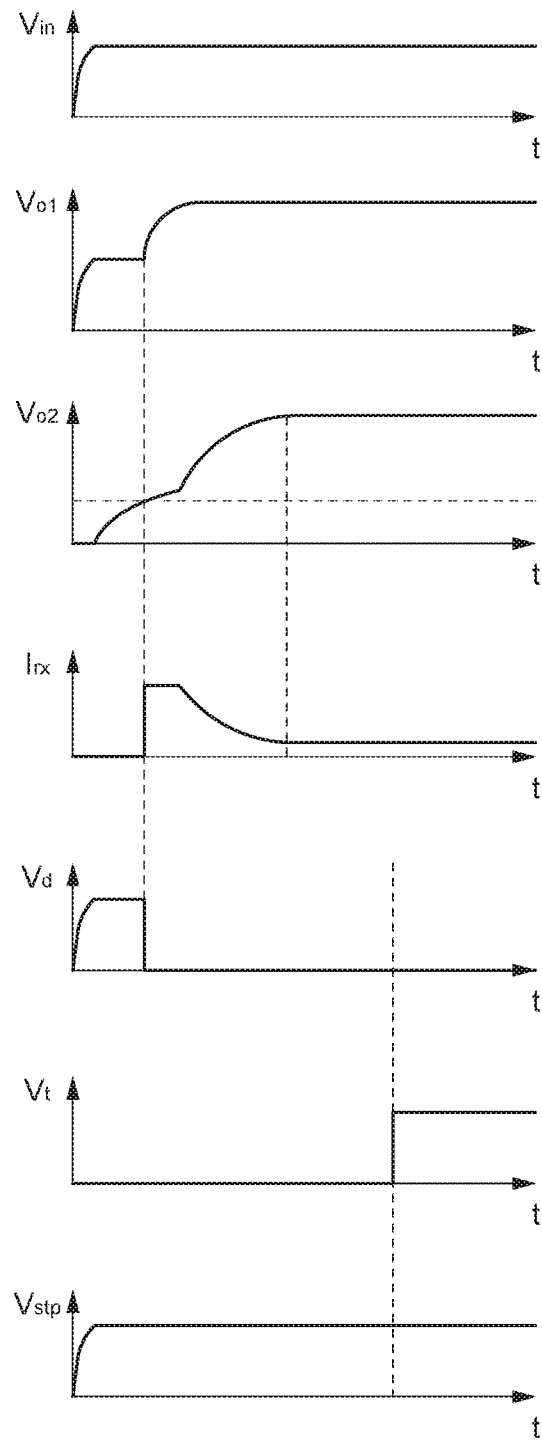
FIG. 6A is a voltage/current waveform diagram for explaining the operations of the power transmission and power reception sides of the wireless power transmission system in a normal operation time.
Figure 6B:
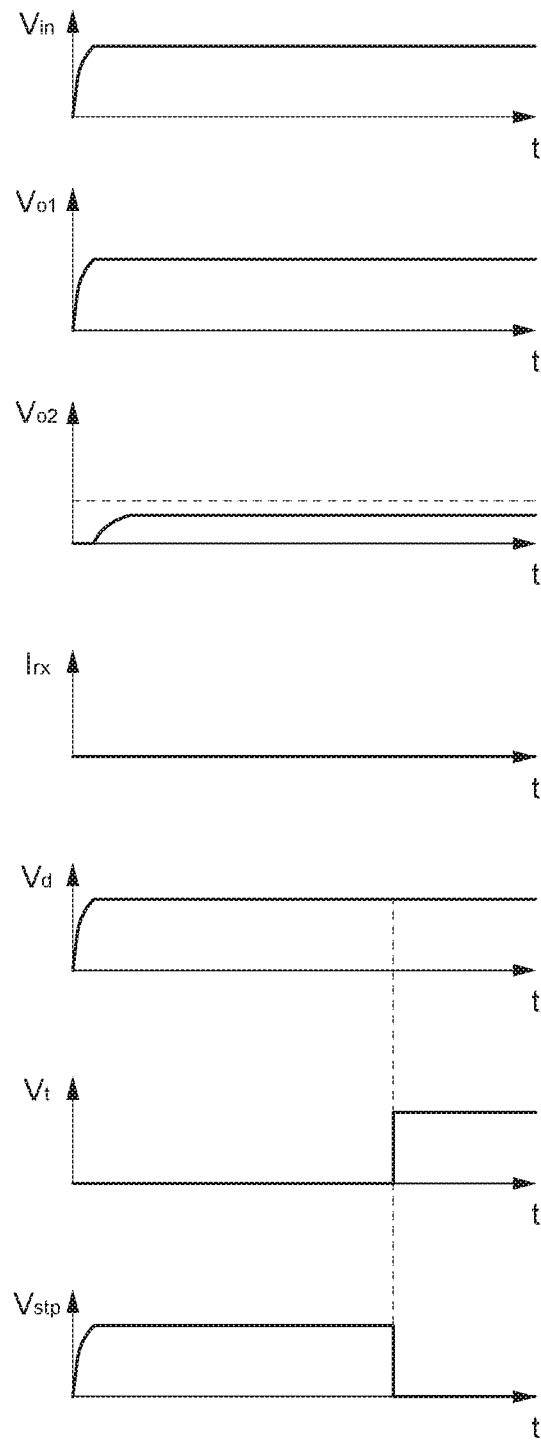
FIG. 6B is a voltage/current waveform diagram for explaining the operations of the power transmission and power reception sides of the wireless power transmission system in an abnormal operation time.

FIGS. 6A and 6B are each a voltage/current waveform diagram for explaining the operations of the power transmission and power reception sides of the wireless power transmission system 1A. FIG. 6A illustrates a normal operation time, and FIG. 6B illustrates an abnormal operation time.

As illustrated in FIG. 6A, in a stage when the boost operation of the boost converter 11 is not started after a predetermined DC voltage $V_{in}$ is input to the boost converter 11, an output voltage $V_{o1}$ of the boost converter 11 assumes substantially the same level as the input voltage $V_{in}$. The output voltage $V_{o1}$ of the boost converter 11 is converted into an AC voltage by the inverter 12 and supplied to the power transmitting coil 13, whereby power is transmitted from the power transmission side to the power receiving side.

Assume that the power receiving coil 21 exists within the power receiving area. In this case, when the wireless power transmitting device 10 starts power transmission, an AC magnetic field generated from the power transmitting coil 13 is taken in the wireless power receiving device 20 through the power receiving coil 21. As a result, the output voltage $V_{o2}$ of the rectifying circuit 22 of the wireless power receiving device 20 is increased in a short time to be equal to or larger than a predetermined reference voltage, whereby the output detection circuit 23 starts operation to be put into a state where it can transmit the power transmission command signal. When the output voltage $V_{o2}$ is further increased to be equal to or larger than a predetermined threshold value, transmission of the power transmission command signal is permitted by the operation of the start-up circuit 25. Then, a current $I_{rx}$ flows in the transmitting circuit 24, and thus an optical signal is output from the signal output diode $PD_s$. That is, the transmitting circuit 24 transmits the power transmission command signal to the wireless power transmitting device 10.

The receiving circuit 14 of the wireless power transmitting device 10 outputs, to the boost control circuit 15, the power transmission command signal obtained through photoelectric conversion of the optical signal. The boost control circuit 15 controls the boost converter 11 based on the power transmission command signal, and the boost converter 11 supplies the output voltage $V_{o1}$ boosted at a boost level proportional to the level of the power transmission command signal.

In a state where the output voltage $V_{o2}$ of the rectifying circuit 22 still remains small, the potential difference input to the operation amplifier 26 is also small, so that the output voltage of the operation amplifier 26 is small. It follows that the forward bias voltage of the signal output diode $PD_s$ is increased to increase the current $I_{rx}$ flowing in the signal output diode $PD_s$, which in turn increases the optical intensity of the signal output diode $PD_s$. The increase in the optical intensity of the signal output diode $PD_s$ increases the level of the power transmission command signal received by the receiving circuit 14 on the power transmission side. It follows that the boost level of the boost converter 11 is increased to increase the output voltage $V_{o1}$ of the boost converter 11.

When the output voltage $V_{o2}$ of the rectifying circuit 22 is increased with the increase in the output voltage $V_{o1}$ of the boost converter 11, the potential difference input to the operation amplifier 26 is increased to increase the output voltage of the operation amplifier 26. It follows that the forward bias voltage of the signal output diode $PD_s$ is reduced to reduce the current $I_{rx}$ flowing in the signal output diode $PD_s$, resulting in a reduction in the optical intensity of the signal output diode $PD_s$. As a result, the increase rate of the output voltage $V_{o1}$ of the boost converter 11 is gradually reduced and becomes constant at a given voltage level, and the optical intensity of the signal output diode $PD_s$ is also gradually reduced and becomes constant at a sufficiently low optical intensity.

When the operation detection circuit 16 detects the boost operation of the boost converter 11, the output voltage $V_d$ of the boost determination section 16a of the operation detection circuit 16 is changed from H level to L level. When the timer voltage $V_t$ becomes an H-level voltage after the elapse of a certain time period from the start of power transmission, the output voltage $V_d$ (L level) of the boost determination section 16a and the timer voltage $V_t$ (H level) are input to the NAND gate 16c, whereby the output voltage $V_{stp}$ (stop signal) of the NAND gate 16c is kept at H level. Thus, the inverter control circuit 17 does not stop the operation of the inverter 12.

Next, operation at abnormal time when the power receiving side cannot receive power will be described.

As illustrated in FIG. 6B, in a stage when the boost operation of the boost converter 11 is not started after a predetermined DC voltage $V_{in}$ is input to the boost converter 11, the output voltage $V_{o1}$ of the boost converter 11 assumes substantially the same level as the input voltage $V_{in}$ as in the case of the normal operation time. The output voltage $V_{o1}$ of the boost converter 11 is converted into an AC voltage by the inverter 12 and supplied to the power transmitting coil 13, whereby power is transmitted from the power transmission side to the power receiving side.

Assume that the power receiving coil 21 does not exist within the power receiving area. In this case, even when the wireless power transmitting device 10 starts power transmission, the power receiving coil 21 cannot receive power, so that the output voltage $V_{o2}$ of the rectifying circuit 22 is not sufficiently increased and does not reach a predetermined threshold value. Thus, even when the output detection circuit 23 starts operation, the start-up circuit 25 does not start operation, and transmission of the power transmission command signal is not permitted. It follows that the current $I_{rx}$ does not flow in the transmitting circuit 24, and thus an optical signal is not output from the photodiode. That is, the transmitting circuit 24 does not transmit the power transmission command signal to the wireless power transmitting device 10.

The receiving circuit 14 of the wireless power transmitting device 10 does not receive the power transmission command signal obtained through photoelectric conversion of the optical signal, so that the boost control circuit 15 does not control the boosting level of the boost converter 11 based on the power transmission command signal, and the output voltage level of the boost converter 11 is not changed.

In such a situation, the operation detection circuit 16 cannot detect the boost operation of the boost converter 11, so that the output voltage $V_d$ of the boost determination section 16a of the operation detection circuit 16 is not changed to L level but kept at H level. When the timer voltage $V_t$ becomes H level after the elapse of a certain time period from the start of power transmission, the output voltage $V_d$(H level) of the boost determination section 16a and the timer voltage $V_t$ (H level) are input to the NAND gate 16c, whereby the output voltage $V_{stp}$ (stop signal) of the NAND gate 16c is changed from H level to L level. Thus, the inverter control circuit 17 stops the operation of the inverter 12.

As described above, in the present embodiment, when the boost converter 11 starts the boost operation after elapse of a certain time period from the start of power transmission, the operation of the inverter 12 is maintained; while when the boost converter 11 has not yet started the boost operation after the elapse of a certain time period from the start of power transmission, the operation of the inverter 12 is forcibly stopped. Thus, unnecessary power transmission operation can be prevented with a simple circuit structure to thereby enhance safety. Thus, it is possible to provide a wireless power transmission system capable of detecting the position of the power receiving coil 21 with an inexpensive configuration and without involving complicated control.

Figure 7:
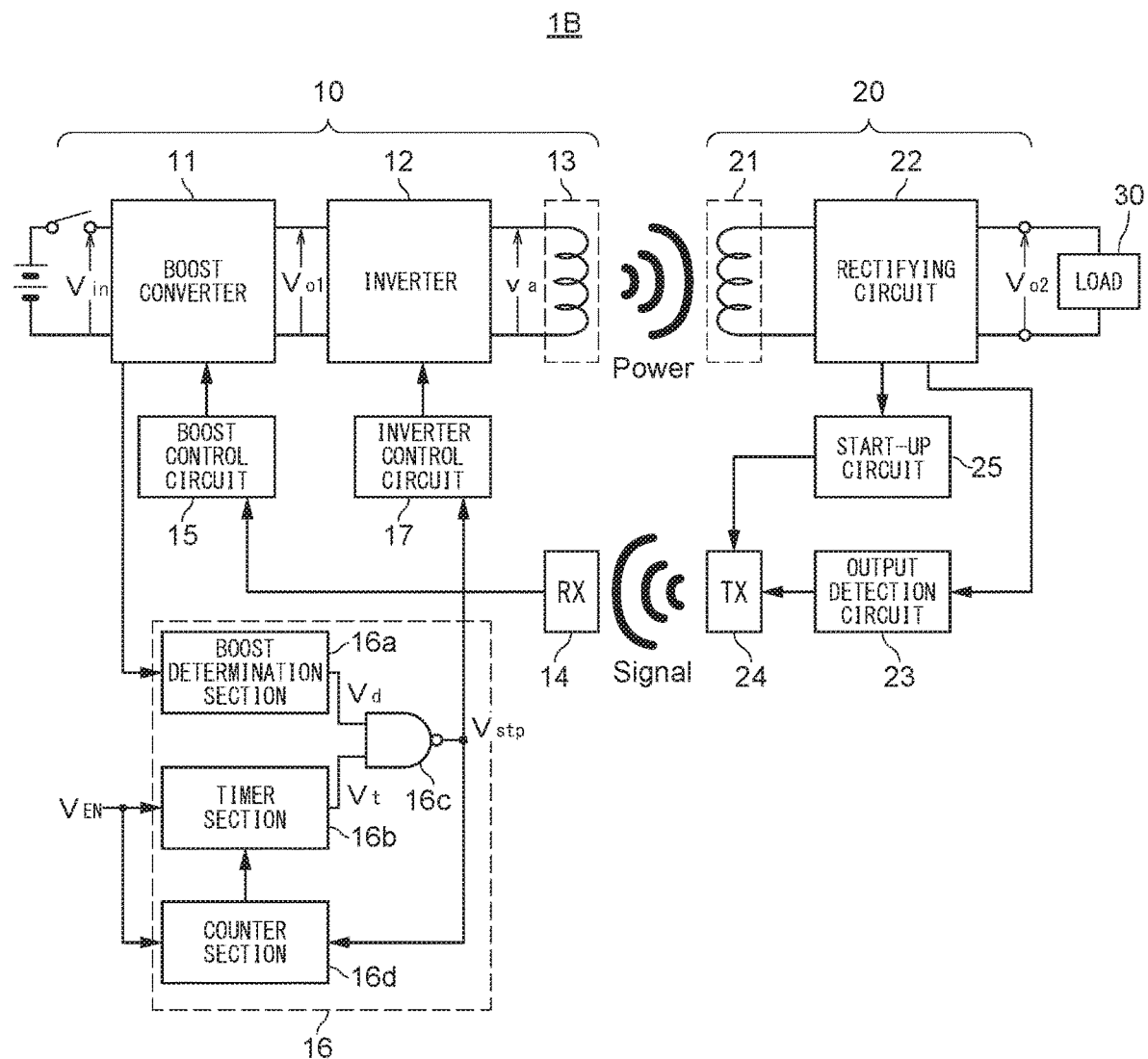
FIG. 7 is a block diagram illustrating the configuration of a wireless power transmission system according to a second embodiment of the present invention.

FIG. 7 is a block diagram illustrating the configuration of a wireless power transmission system according to the second embodiment of the present invention.

As illustrated in FIG. 7, a wireless power transmission system 1B of the present embodiment is featured as follows. That is, when the boost operation of the boost converter 11 cannot be detected after the elapse of a certain time period from the start of power transmission, operation of the inverter 12 is once stopped. After that, operation of the inverter 12 is resumed until such an abnormal operation occurs a predetermined number of times; while operation of the inverter 12 is not resumed at a time point when the number of times of occurrence of the abnormal operation reaches a predetermined number of times.

To realize the above configuration, the operation detection circuit 16 according to the present embodiment further includes a counter section 16d that counts an abnormal operation count value. When the boost operation of the boost converter 11 cannot be detected, a stop signal is output from the NAND gate 16c, and the stop signal is also input to the counter section 16d. Upon receiving the stop signal, the counter section 16d increments the abnormal operation count value and inputs a start signal to the timer section 16b after the elapse of a predetermined time period, whereby the timer section 16b is restarted, and power transmission is resumed. When the boost converter 11 does not perform the boost operation after the elapse of a certain time period from the restart, the stop signal is generated again.

When the abnormal operation count value reaches a predetermined value (e.g., several times) after repetition of the above operation, the counter section 16d ends supply of the start signal to the timer section 16b. As described above, power transmission is resumed until the abnormal operation count value reaches a predetermined value (several times), and when the boost converter 11 does not perform the boost operation even after the abnormal operation count value reaches the predetermined value, a stop state of the inverter 12 is maintained to prevent power transmission from being resumed.

At the abnormal operation time, it is preferable to shorten the timer time so as to promptly stop the inverter for safety; however, a reduction in the timer time may increase a possibility that the operation state (normal or abnormal) of the boost converter 11 is erroneously detected. However, in the present embodiment, the detection step of detecting whether or not the boost converter 11 is operated is repeated several times, and the operation of the inverter 12 is completely stopped when the abnormal operation is continuously detected several times. In such a case, the probability of the erroneous detection can be reduced even the timer time is shortened.

It is apparent that the present invention is not limited to the above embodiments, but may be modified and changed without departing from the scope and spirit of the invention.

For example, although the boost level of the boost converter 11 is controlled so as to make the output voltage of the rectifying circuit 22 constant in the above embodiments, the boost level may be controlled so as to make the output current of the rectifying circuit 22 constant. That is, it is only necessary for the output detection circuit 23 to generate the power transmission command signal based on a comparison result between an output characteristic value (output voltage, output current, or output power) of the rectifying circuit 22 and a target value.

The circuit configurations of the respective sections of the wireless power transmitting device 10 and wireless power receiving device 20 are illustrative, and other various circuit configurations may be adopted.

As described above, according to the present embodiment, there is provided a wireless power transmitting device that transmits power to a wireless power receiving device by wireless, the wireless power transmitting device includes: a boost converter that boosts an input DC voltage; an inverter that converts an output voltage of the boost converter into an AC voltage; a power transmitting coil that is supplied with the AC voltage to generate an AC magnetic field; a receiving circuit that receives a power transmission command signal from the wireless power receiving device; a boost control circuit that controls a boost level of the boost converter according to the power transmission command signal; an operation detection circuit that detects whether or not the boost converter is operated; and an inverter control circuit that controls the inverter, wherein the operation detection circuit activates a stop signal when detecting that the boost converter does not perform operation after an elapse of a predetermined time period from a start of power transmission, and wherein the inverter control circuit stops an operation of the inverter in response to the stop signal.

According to the present embodiments, the entire wireless power transmitting device including the inverter starts operation at the start of power transmission, and the control circuit maintains the operation of the inverter when it is detected that the boost converter is performing boost operation after the elapse of a certain time period from the start of power transmission; while the control circuit stops the operation of the inverter when it is detected that the boost converter is not performing boost operation. Thus, it is possible to detect a situation where power transmission should not be continued, such as a case where a power receiving coil does not exist within a power receiving area, thereby enhancing safety and reliability of the device. Thus, it is possible to provide a wireless power transmission system capable of detecting the position of the power receiving coil with an inexpensive configuration and without involving complicated control.

In the present embodiments, the operation detection circuit is preferably configured to increments an abnormal operation count value when the operation detection circuit does not detect an operation of the boost converter after the elapse of the predetermined time period from the start of power transmission. The operation detection circuit preferably resumes power transmission until the abnormal operation count value reaches a predetermined value and does not resume power transmission at a time when the abnormal operation count value reaches the predetermined value. With this configuration, it is possible to stop the inverter in a short time without erroneously detecting a state where the boost converter does not perform the boost operation.

A wireless power transmission system according to the present embodiments includes the wireless power transmitting device of the present embodiments having the above features and a wireless power receiving device that receives power from the wireless power transmitting device by wireless. The wireless power receiving device includes: a power receiving coil that takes in AC power through the AC magnetic field; a rectifying circuit that converts the AC power received by the power receiving coil into DC power; an output detection circuit that generates the power transmission command signal based on a comparison result between an output characteristic value of the rectifying circuit and a target value; a transmitting circuit that transmits the power transmission command signal; and a start-up circuit that permits transmission of the power transmission command signal to the receiving circuit when the output characteristic value of the rectifying circuit is equal to or larger than a threshold value.

According to the present embodiments, when the output characteristic value of the rectifying circuit does not reach the threshold value even after power transmission is started (for example, when the power receiving coil does not exist within a power receiving area), the start-up circuit does not permit the transmission of the power transmission command signal. It follows that the receiving circuit on the wireless power transmitting device side does not receive the power transmission command signal, so that the boost operation of the boost converter is not performed. Accordingly, it is detected that the boost converter does not perform the boost operation after the elapse of a certain time period from the start of power transmission, whereby the control circuit can stop the operation of the inverter, thereby enhancing safety and reliability of the device. Thus, it is possible to provide a wireless power transmission system capable of detecting the position of the power receiving coil with an inexpensive configuration and without involving complicated control.

In the present embodiments, the start-up circuit preferably includes a comparing circuit that compares the output characteristic value of the rectifying circuit and the threshold value; a switching element that controls whether or not to output the power transmission command signal from the transmitting circuit based on a comparison result of the comparing circuit; and an input setting section that can change at least one of the output characteristic value of the rectifying circuit which are to be input to the comparing circuit and the threshold value. Thus, when the threshold value is increased relative to the output characteristics value, a power transmission start condition is made severe, allowing the power receiving area to be set narrow; conversely, when the threshold value is reduced relative to the output characteristics value, the power transmission start condition is relaxed, allowing the power receiving area to be set wide. Thus, it is possible to easily control the severity of the power transmission start condition.

In the present embodiments, it is preferable that the output detection circuit increases the level of the power transmission command signal when the output characteristics value is smaller than the target value and reduces the power transmission command signal when the output characteristics value is larger than the target value. With this configuration, operation of the inverter can be reliably stopped when the power receiving coil does not exist within the power receiving area. Thus, it is possible to secure safety and to prevent unnecessary power consumption.

In the present embodiments, it is preferable that the power transmission command signal is an optical signal and that the output detection circuit controls the intensity of the optical signal based on a comparison result between the output characteristics value and the target value. Thus, the optical signal is output only when power transmission is instructed, so that when, for example, the optical signal and power transmission are interrupted due to existence of a foreign matter between the wireless power transmitting device and the wireless power receiving device, power transmission operation can be stopped promptly without erroneous operation.

According to the present embodiments, it is possible to provide a wireless power transmitting device having an inexpensive and high-quality position detection function and a wireless power transmission system using the wireless power transmitting device.

What is claimed is:

1. A wireless power transmitting device that transmits power to a wireless power receiving device by wireless, the wireless power transmitting device comprising:
   a boost converter that boosts an input DC voltage;
   an inverter that converts an output voltage of the boost converter into an AC voltage;
   a power transmitting coil that is supplied with the AC voltage to generate an AC magnetic field;
   a receiving circuit that receives a power transmission command signal from the wireless power receiving device;
   a boost control circuit that controls a boost level of the boost converter according to the power transmission command signal;
   an operation detection circuit that detects whether or not the boost converter is operated; and
   an inverter control circuit that controls the inverter,
   wherein the operation detection circuit activates a stop signal when detecting that the boost converter does not perform operation after an elapse of a predetermined time period from a start of power transmission, and
   wherein the inverter control circuit stops an operation of the inverter in response to the stop signal.

2. The wireless power transmitting device as claimed in claim 1,
   wherein the operation detection circuit is configured to increments an abnormal operation count value when the operation detection circuit does not detect an operation of the boost converter after the elapse of the predetermined time period from the start of power transmission, and
   wherein the operation detection circuit resumes power transmission until the abnormal operation count value reaches a predetermined value and does not resume power transmission at a time when the abnormal operation count value reaches the predetermined value.

3. A wireless power transmission system comprising:
   a wireless power transmitting device; and
   a wireless power receiving device that receives power from the wireless power transmitting device by wireless,
   wherein the wireless power transmitting device comprising:
      a boost converter that boosts an input DC voltage;
      an inverter that converts an output voltage of the boost converter into an AC voltage;
      a power transmitting coil that is supplied with the AC voltage to generate an AC magnetic field;
      a receiving circuit that receives a power transmission command signal from the wireless power receiving device;
      a boost control circuit that controls a boost level of the boost converter according to the power transmission command signal;
      an operation detection circuit that detects whether or not the boost converter is operated; and
      an inverter control circuit that controls the inverter,
   wherein the operation detection circuit activates a stop signal when detecting that the boost converter does not perform operation after an elapse of a predetermined time period from a start of power transmission,
   wherein the inverter control circuit stops an operation of the inverter in response to the stop signal,
   wherein the wireless power receiving device includes:
      a power receiving coil that takes in AC power through the AC magnetic field;
      a rectifying circuit that converts the AC power received by the power receiving coil into DC power;
      an output detection circuit that generates the power transmission command signal based on a comparison result between an output characteristic value of the rectifying circuit and a target value;
      a transmitting circuit that transmits the power transmission command signal; and
      a start-up circuit that permits transmission of the power transmission command signal to the receiving circuit when the output characteristic value of the rectifying circuit is equal to or larger than a threshold value.

4. The wireless power transmission system as claimed in claim 3, wherein the start-up circuit includes:
   a comparing circuit that compares the output characteristic value of the rectifying circuit and the threshold value;
   a switching element that controls whether or not to output the power transmission command signal from the transmitting circuit based on a comparison result of the comparing circuit; and
   an input setting section that can change at least one of the output characteristic value of the rectifying circuit which are to be input to the comparing circuit and the threshold value.

5. The wireless power transmission system as claimed in claim 3, wherein the output detection circuit increases a level of the power transmission command signal when the output characteristics value is smaller than the target value and reduces the power transmission command signal when the output characteristics value is larger than the target value.

6. The wireless power transmission system as claimed in claim 5, wherein the power transmission command signal is an optical signal, and wherein the output detection circuit controls an intensity of the optical signal based on a comparison result between the output characteristics value and the target value.

* * * * *